C. L. DABOLL.
Lamp Chimney.
No. 38,657.
Patented May 26, 1863.
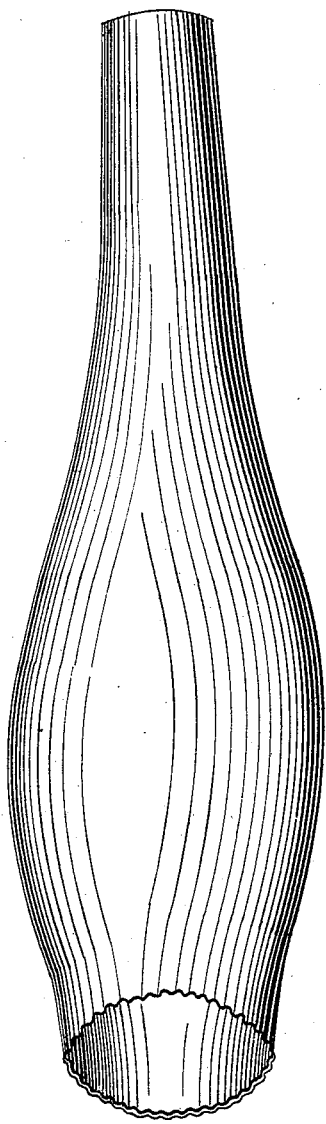
Witnesses
Donald Mann
Joslyn Hutchinson
Inventor
Celadon L. Daboll

UNITED STATES PATENT OFFICE.

CELADON L. DABOLL, OF NEW LONDON, CONNECTICUT.

IMPROVEMENT IN THE CONSTRUCTION OF GLASS CHIMNEYS FOR LAMPS.

Specification forming part of Letters Patent No. 38,657, dated May 26, 1863; antedated March 1, 1863.

*To all whom it may concern:*

Be it known that I, CELADON L. DABOLL, of New London, in the county of New London and State of Connecticut, have invented a new and useful improvement in the method of constructing or manufacturing glass chimneys for lamps used for burning kerosene and other oils and fluids; and I do hereby declare that the following is a full and exact description thereof, reference being had to the accompanying drawings and model.

The nature of my invention consists in corrugating or otherwise forming the lower end, flange, or rim of the chimney, which otherwise may be constructed in any of the known forms, in such manner as will admit of atmospheric air under and at the bottom of the chimney immediately around the cone of the burner inside of the chimney, thus contributing to the proper and necessary diffusion of atmospheric air, by which kerosene and other oils and fluids are allowed to burn freely and without smoke.

What I claim as my invention is—

The plan of corrugating or otherwise forming the lower edge, rim, or flange of glass chimneys in such manner as to admit the atmospheric air inside and under the bottom of the chimney, for the purposes hereinbefore described.

CELADON L. DABOLL.

Witnesses:
 PETER COOKE,
 W. DAUFF.